US009516814B1

(12) United States Patent
Fraser et al.

(10) Patent No.: US 9,516,814 B1
(45) Date of Patent: Dec. 13, 2016

(54) PRODUCE HARVESTOR

(71) Applicants: Norman Fraser, Kissimmee, FL (US); Carl P. Deal, III, Wesley Chapel, FL (US); Charles E. Patterson, Sr., Dade City, FL (US)

(72) Inventors: Norman Fraser, Kissimmee, FL (US); Carl P. Deal, III, Wesley Chapel, FL (US); Charles E. Patterson, Sr., Dade City, FL (US)

( * ) Notice: Subject to any disclaimer, the term of this patent is extended or adjusted under 35 U.S.C. 154(b) by 0 days.

(21) Appl. No.: 14/628,951

(22) Filed: Feb. 23, 2015

(51) Int. Cl.
*A01D 46/253* (2006.01)
*A01D 46/26* (2006.01)

(52) U.S. Cl.
CPC ........... *A01D 46/253* (2013.01); *A01D 46/264* (2013.01)

(58) Field of Classification Search
CPC ........ A01D 46/00; A01D 46/02; A01D 46/24; A01D 46/247; A01D 46/253
USPC .............................. 56/328.1, 329, 332, 340.1
See application file for complete search history.

(56) References Cited

U.S. PATENT DOCUMENTS

| | | | | | |
|---|---|---|---|---|---|
| 771,842 | A | * | 10/1904 | Stansbury et al. | A01D 46/005 56/332 |
| 2,775,088 | A | * | 12/1956 | Bullock | A01D 46/005 56/332 |
| 3,306,019 | A | * | 2/1967 | MacCurdy | A01D 46/253 56/332 |
| 3,377,786 | A | * | 4/1968 | Edgemond, Jr. | A01D 46/26 56/340.1 |
| 3,410,068 | A | * | 11/1968 | Recker | A01D 46/24 56/332 |
| 4,275,549 | A | * | 6/1981 | Deal, Jr. | A01D 46/24 56/328.1 |
| 4,350,005 | A | * | 9/1982 | Tran | A01D 46/247 56/340 |
| 6,298,645 | B1 | * | 10/2001 | Hai | A01D 46/247 56/330 |

* cited by examiner

*Primary Examiner* — John G Weiss
(74) *Attorney, Agent, or Firm* — Gulf Coast Intellectual Property Group

(57) ABSTRACT

A produce harvester that is operable to utilize a produce collection assembly wherein the produce collection assembly is rotatably moved during the collection of produce from a tree. The produce collection assembly includes a body that is spherical in shape having an upper portion and a lower portion forming an interior volume. The upper portion is rotatably mounted to the lower portion with the lower portion being secured to a conventional mechanical articulating boom that is operable to move the produce collection assembly in three axial directions. The upper portion includes an outer surface that has formed thereon a plurality of longitudinally oriented concave portions. Intermediate the plurality of concave portions are transition ridges. A conical protrusion is integrally formed with the upper portion and extends outward from the upper portion. A plurality of fruit apertures are journaled through the upper portion providing access to the interior volume.

15 Claims, 3 Drawing Sheets

PRODUCE HARVESTOR

FIELD OF THE INVENTION

Figure 1:
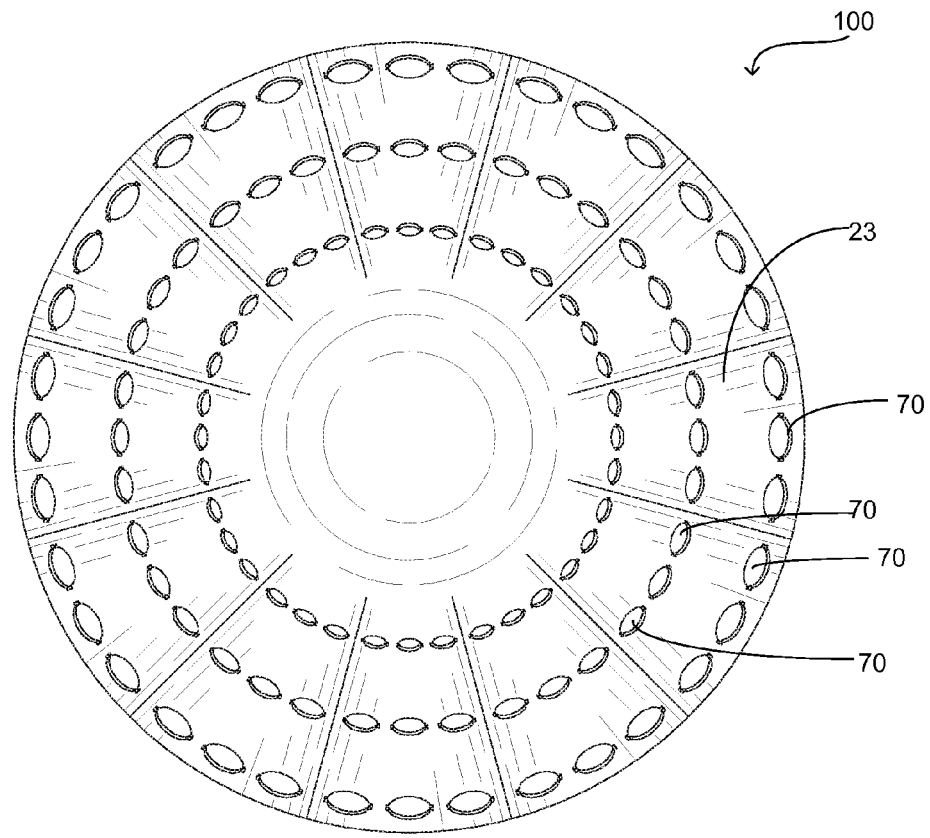

The present invention relates generally to agricultural equipment, more specifically but not by way of limitation, a produce harvester that is operable to retrieve produce from a tree wherein the produce harvester is constructed to successfully harvest produce from a tree and substantially avoid long-term damage to the tree during the harvesting procedure.

BACKGROUND

Harvesting is an important time in the agricultural industry especially in the areas of certain types of produce such as but not limited to citrus. Ensuring a good yield from the crop and delivering to market in a timely manner can mean millions of dollars to a single produce farmer. Depending on the type of produce, there have been many types of harvesting techniques employed over the years. Conventional techniques range from utilizing crews of labor to hand pick the produce to various automated machines.

One problem with conventional harvesting techniques such as utilizing crews of labor is the cost and effectiveness. Utilizing crews of labor is often very slow and the cost for the grower to employ this technique is often very high as this harvesting technique can take days or weeks. Another issue with conventional harvesting techniques is the current technology utilized to automate harvest. By way of example but not limitation, it is common in the citrus industry to utilize machinery that harvests the produce by vigorously shaking the tree. The falling fruit is collected either manually or by automated belts and deposited for shipment. One problem with this technique is that it causes long-term damage to the tree. Orange trees in particular have shown that once subjected to this type of harvesting the life span of the tree is shortened to only a few years. This is undesirable as it creates the need to continually develop and grow new trees, which can be an issue with limited land availability.

Other current types of automated technology that is utilized for fruit harvesting include vacuum type apparatus and various mechanical pickers. These types of devices have shown to be difficult to manipulate and cost prohibitive to operate.

Accordingly, there is a need for an automated produce harvester that is operable to efficiently harvest fruit from a tree wherein the automated produce harvester is constructed and utilizes a technique that substantially inhibits damage to the tree during the harvesting process.

SUMMARY OF THE INVENTION

It is the object of the present invention to provide a produce harvester that includes a produce collection assembly wherein the produce collection assembly has an upper portion and a lower portion and wherein the produce collection assembly has an interior volume.

Another object of the present invention is to provide a produce harvester that is operable to harvest fruit from a tree inflicting minimal damage thereto wherein the upper portion of the produce collection assembly includes a plurality of apertures operable to receive produce therethrough.

A further object of the present invention is to provide a produce harvester that is operable to harvest fruit from a tree wherein the upper portion of the produce collection assembly is rotatably mounted to the lower portion.

An additional object of the present invention is to provide a produce harvester that is operable to harvest fruit from a tree and inflict minimal damage thereto wherein the produce collection assembly is operably coupled to an articulating boom so as to be manipulated around a tree during the harvesting process.

Yet a further object of the present invention is to provide a produce harvester that is operable to harvest fruit from a tree wherein the bottom portion of the produce collection assembly is operably coupled to the articulating mechanical boom.

Still another object of the present invention is to provide a produce harvester operable to efficiently harvest produce from a tree and inflict minimal damage thereto wherein the upper portion of the produce collection assembly includes a conical-shaped protrusion that is operably to facilitate penetration around the limbs of the tree.

An alternative object of the present invention is to provide a produce harvester operable to efficiently harvest produce from a tree while reducing the damage thereto wherein the upper surface of the upper portion of the produce collection assembly includes a series of contiguous concave portions.

Another object of the present invention is to provide a produce harvester operable to harvest produce from a tree and avoid substantial damage thereto that further includes transition peaks intermediate each contiguous concave portion on the upper surface of the upper portion of the produce collection assembly.

To the accomplishment of the above and related objects the present invention may be embodied in the form illustrated in the accompanying drawings. Attention is called to the fact that the drawings are illustrative only. Variations are contemplated as being a part of the present invention.

BRIEF DESCRIPTION OF THE ASSEMBLY

Figure 2:
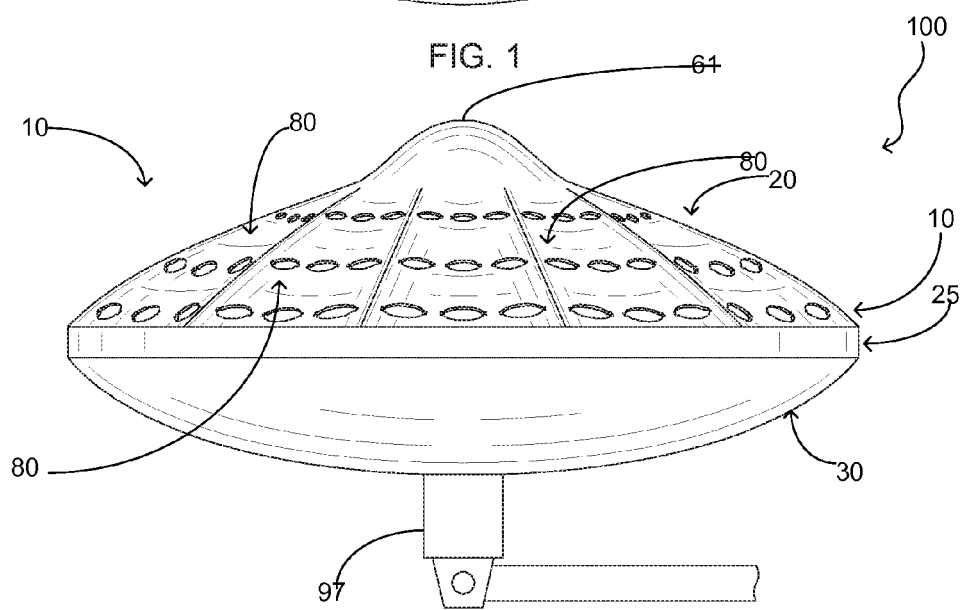
Figure 3:
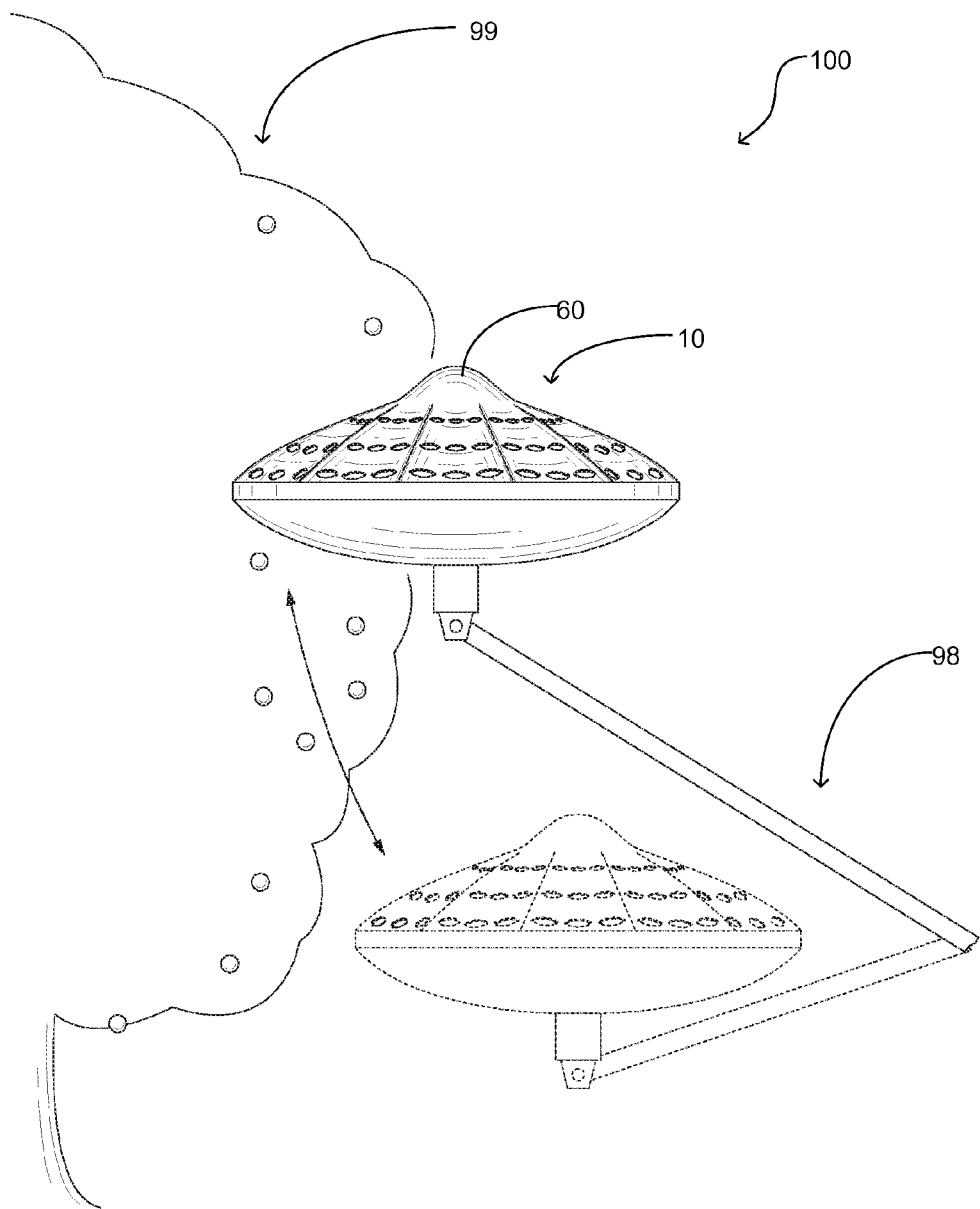
Figure 4:
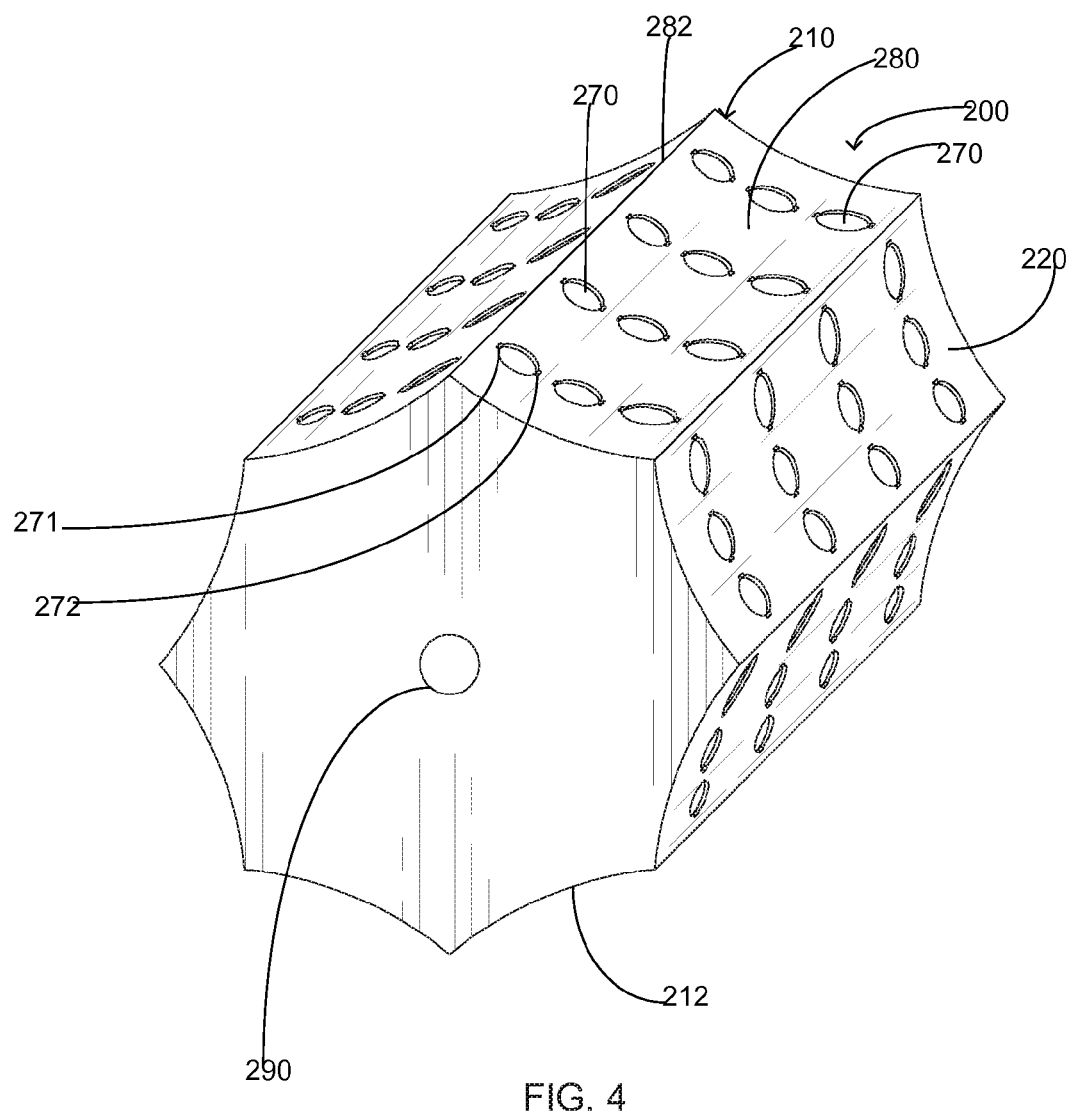

A more complete understanding of the present invention may be had by reference to the following Detailed Description when taken in conjunction with the accompanying Drawings wherein:

FIG. 1 is a top view of the produce collection assembly of the present invention; and FIG. 2 is a side view of the produce collection assembly of the present invention; and FIG. 3 is a perspective view of the present invention adjacent to an exemplary produce tree; and FIG. 4 is an alternative embodiment of the produce collection assembly of the present invention.

DETAILED DESCRIPTION

Referring now to the drawings submitted herewith, wherein various elements depicted therein are not necessarily drawn to scale and wherein through the views and figures like elements are referenced with identical reference numerals, there is illustrated a produce harvester 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Now referring in particular to FIGS. 1 and 2 herein, the produce harvester 100 further includes a produce collection assembly 10. The produce collection assembly 10 includes body 15 having an upper portion 20 and a lower portion 30. The upper portion 20 and lower portion 30 are partially spherical in shape and are coupled proximate midpoint 25. The body 15 is hollow having an interior volume that is operable to receive and store produce therein. The upper portion 20 and lower portion 30 are manufactured from a suitable durable material such as but not limited to metal. While no particular diameter is required for the body 15 of the produce collection assembly 10, good results have been achieved utilizing a body 15 that is approximately six feet in diameter.

The produce collection assembly 10 is operable to be rotatable so as to facilitate the collection of produce from an exemplary tree 99. It is contemplated within the scope of the present invention that the produce collection assembly 10 is rotatable utilizing a first technique and a second technique. The produce collection assembly 10 is operably coupled to a conventional articulating boom 98 having the necessary elements to maneuver in three axis directions. Additionally, the conventional boom 98 either includes or is coupled to a motor or other suitable power source that is operable to provide rotation of the produce collection assembly 10. The first technique of rotatable movement of the produce collection assembly 10 is executed by rotation of the entire body 15 of the produce collection assembly 10. The produce collection assembly 10 is operably coupled to the articulating boom 98 via fastener 97. In the first technique of rotational movement of the produce collection assembly 10, the articulating boom 10 is operable to rotate the entire body 15. In this first technique, the fastener 97 is constructed so as to facilitate the rotation of the entire body 15. Those skilled in the art will recognize that the fastener 97 could be constructed in numerous different manners in order to achieve the rotation of the entire body 15 so as to implement the first rotational technique of the present invention.

In the second technique of rotatable movement, it is contemplated within the scope of the present invention that the upper portion 20 is rotatably mounted to the lower portion 30. In this second technique, the upper portion 20 will rotate so as to facilitate the collection of produce and the lower portion 30 remains stationary. In this second technique of rotation, the fastener 97 is constructed to provide a stationary coupling between the lower portion 30 and the articulating boom 98. In the second technique of rotatable movement, the articulating boom 98 can be manipulated in three different axial directions, (X, Y and Z) in order to maneuver the produce collection assembly 10 around the exemplary tree 99 to collect produce. The articulating boom 98 is coupled to the bottom portion 30. This is important in order to facilitate a desirable result of harvesting produce. Operably coupling the articulating boom 98 to the bottom portion 30 facilitates the improved penetration of the produce collection assembly 10 into the exemplary tree 99. This greatly improves the ability to ensure complete harvest of the produce from the tree and further promotes the penetration of the conical protrusion 60 as further discussed herein. Those skilled in the art will recognize that the upper portion 20 could be rotatably mounted to the lower portion 30 utilizing numerous different conventional fasteners and methods.

The upper portion 20 includes outer surface 23. The outer surface 23 includes a plurality of fruit apertures 70. The fruit apertures 70 include opening 76 and are journaled through the outer surface 70 utilizing suitable durable techniques and are operable to engage produce on an exemplary tree 99 during use of the produce harvester 100. As the produce collection assembly 10 is rotated in either the first technique or the second technique the outer surface 23 is moved to a position such that it is engaged with a portion of the exemplary tree. As the produce collection assembly 10 rotates produce biased against the outer surface 23 will collapse into the fruit apertures 70 and be disconnected from the tree 99 and received into the interior volume of the body 15. The fruit apertures 70 are contemplated to be either round or oval in shape and of substantially the same size. The fruit apertures 70 further include a contiguous first notch 71 and a second notch 72 diametrically opposite the first notch 71. The first notch 71 and second notch 72 are operable to facilitate the separation of a fruit being harvested from its supporting stem. The first notch 71 and second notch 72 are diametrically opposed so as to facilitate the aforementioned functionality regardless of the rotational direction of the produce collection assembly 10. It is contemplated within the scope of the present invention that the fruit apertures 70 could be manufactured in having different diameters wherein a particular diameter may be desirable for harvesting a certain type of produce. It is further contemplated within the scope of the present invention that the fruit apertures 70 could be operable to receive inserts so as to decrease to diameter of the opening 76 in order to harvest a certain type of produce.

The outer surface 23 of the upper portion further includes conical protrusion 60. The conical protrusion 60 is located at the apex of the upper portion 20 and in contiguously formed therewith and further includes a dome-shaped top 61. The conical protrusion 60 extends outward so as to facilitate the penetration of the produce collection assembly 10 between branches of an exemplary tree in order to place the fruit apertures 70 in a position so as to harvest any fruit growing on an exemplary tree that may be positioned more internally within the growth of the exemplary tree 99. It is contemplated within the scope of the present invention that the conical protrusion 60 could be formed in various different sizes and still accomplish the desired functionality as described herein.

Referring in particular to FIG. 2, the outer surface 23 includes a plurality of contiguous concave portion 80. The concave portions 80 of the outer surface 23 extend longitudinally from proximate the conical protrusion 60 to midpoint 25. The concave portions 80 form depressions 81 having transition ridges 82 therebetween. Each concave portion 80 is formed so as to be approximately the same width intermediate the transition ridges 82. The concave portions 80 and the transition ridges 82 function to improve collection of produce during rotation of the produce collection assembly 10. As the produce collection assembly 10 is rotated and biased against the exemplary tree 99, fruit growing on the exemplary tree 99 is biased against the outer surface 23. During rotation, fruit will engage a portion of the outer surface 23 and subsequently engage a fruit aperture 70. As fruit traverses across the outer surface 23 the change in elevation of the outer surface proximate the transition ridges 82 facilitates the improved penetration of a fruit into opening 76 of a fruit aperture 70. The transition ridge 82 further promotes improved separation of fruit from its stem. While a plurality of concave portions 80 are illustrated herein, it is contemplated within the scope of the present invention that the outer surface 23 could have as few as two concave portions 80.

While not illustrated herein, it is contemplated within the scope of the present invention that the bottom portion 30 could include at least one access hatch so as to facilitate access to the interior volume of the produce collection assembly 10 for the retrieving of produce stored therein.

Referring in particular to FIG. 4 herein, an alternative embodiment of the produce collection assembly 200 is illustrated therein. The produce collection assembly 200 includes a body 210 manufactured from a suitable durable material such as but not limited to metal. The hollow body 210 includes an outer wall 212 having formed therein a plurality of concave portions 280. Journaled through the outer wall 212 are fruit apertures 270 wherein the fruit apertures 270 further include a first notch 271 and second notch 272. The outer wall 212 has formed therewith a plurality of concave portions 280 with transition ridges 282 therebetween. The alternative embodiment of the produce collection assembly 10 is mechanically coupled to a conventional articulating boom via axle 290. As with the preferred embodiment herein, the produce collection assembly 200 is rotated using conventional machinery and manipulated around an exemplary tree 99 in order to facilitate the harvest of produce growing thereon.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A produce harvester operable to harvest produce from a tree comprising:
   a produce collection assembly, said produce collection assembly having a body, said body having an outer wall operable to form an interior volume, said produce collection assembly operable to be manipulated around a produce tree, wherein the produce collection assembly further includes a plurality of fruit apertures journaled through the outer wall, said fruit apertures having an opening; and
   wherein the outer wall of the body further includes a plurality of concave portions, said plurality of concave portions forming depressions, said plurality of concave portions extending the length of the body of said produce collection assembly, said plurality of concave portions operable to have produce biased thereagainst during use of the produce harvester.

2. The produce harvester as recited in claim 1, wherein the outer wall of the body further includes a plurality of transition ridges, said transition ridges creating elevation points that are greater than that within the depressions.

3. The produce harvester as recited in claim 2, wherein the produce collection assembly is coupled to a mechanical boom and is operable to be rotatably moved in order to facilitate the collection of produce.

4. The produce harvester as recited in claim 3, wherein the fruit apertures further includes a first notch and a second notch, said first notch and said second notch be diametrically opposite each other.

5. A produce harvester operable to harvest produce from a tree comprising:
   a produce collection assembly, said produce collection assembly having a body being spherical in shape, said body having a upper portion and a lower portion being operably coupled to form an interior volume, said upper portion having an outer surface, said upper portion configured to have produce suspending from a tree biased thereagainst;
   a plurality of fruit apertures, said plurality of fruit apertures being journaled through said upper portion, said plurality of fruit apertures having an opening operable to provide produce access to the interior volume of said body,
   a plurality of concave portions, said concave portions being formed in said upper portion of said body, said plurality of concave portions forming depressions in the outer surface, said plurality of concave portions extending downward along the upper portion of said body; and
   wherein the produce collection assembly is rotatably mounted to an articulating mechanical boom.

6. The produce harvester as recited in claim 5, and further including a plurality of transition ridges, said transition ridges being intermediate said plurality of concave portions, said transition ridges formed so as to provide a portion of the outer surface that has an elevation higher than that of the depressions of the plurality of concave portions.

7. The produce harvester as recited in claim 6, wherein the upper portion of the produce collection assembly further includes a conical protrusion, said conical protrusion proximate the apex of the body of the produce collection assembly, said conical protrusion operable to penetrate intermediate limbs of a tree.

8. The produce harvester as recited in claim 7, wherein said conical protrusion further includes a dome shaped top.

9. The produce harvester as recited in claim 8, wherein the fruit apertures include a first notch and a second notch, said first notch and said second notch being diametrically opposite.

10. The produce harvester as recited in claim 9, wherein during operation of the produce harvester, the outer surface of the upper portion is positioned against a produce tree such that any fruit growing therein is biased against the outer surface when the produce collection assembly is proximate thereto.

11. A produce harvester operable to facilitate the harvest of produce growing on a tree through rotation of a produce collection assembly that forms a part thereof comprising:
  a produce collection assembly, said produce collection assembly having a body that is spherical in shape, said body having an apex, said body having an upper portion and a lower portion operably coupled so as to form an interior volume, said interior volume functioning to receive and store fruit therein, said upper portion having an outer surface wherein the outer surface includes a plurality of fruit apertures journaled therethrough, said fruit apertures having an opening so as to permit produce engaging therewith to penetrate into the interior volume of the body, said lower portion of said body being operably coupled to a mechanical articulating boom;
  a plurality of concave portions, said plurality of concave portions being formed in the outer surface of said upper portion, said plurality of concave portions being formed longitudinally on said upper portion, said plurality of concave portions having a depression;
  a conical protrusion, said conical protrusion being integrally formed with said upper portion of said body, said conical protrusion being proximate the apex of said body and extending outward therefrom, said conical protrusion operable to facilitate penetration of a portion of the body proximate thereto intermediate limbs of a tree such that fruit growing thereon will engage at least one fruit aperture adjacent to the conical protrusion.

12. The produce harvester as recited in claim 11, and further including a plurality of transition ridges, said transition ridges being intermediate the plurality of concave portions, said transition ridges having a higher elevation than that of the depressions of the concave portion wherein the transition ridges improve the removal of produce from a supporting stem.

13. The produce harvester as recited in claim 12, wherein the lower portion of the body is fixedly coupled to a mechanical articulating boom.

14. The produce harvester as recited in claim 13, wherein the fruit apertures include a first notch and a second notch, said first notch and said second notch being diametrically opposite.

15. The produce harvester as recited in claim 14, wherein the conical protrusion further includes a dome-shaped top portion.

\* \* \* \* \*